United States Patent [19]

Fell et al.

[11] Patent Number: 5,235,471

[45] Date of Patent: Aug. 10, 1993

[54] METHOD OF CONVERTING THE DATA RATE OF A DATA SIGNAL

[75] Inventors: Wolfgang Fell, Seeheim; Rolf Hedtke, Darmstadt, both of Fed. Rep. of Germany

[73] Assignee: BTS Broadcast Television Systems GmbH, Darmstadt, Fed. Rep. of Germany

[21] Appl. No.: 835,040

[22] Filed: Feb. 10, 1992

Related U.S. Application Data

[63] Continuation of Ser. No. 440,236, Nov. 22, 1989, abandoned.

[30] Foreign Application Priority Data

Nov. 30, 1988 [DE] Fed. Rep. of Germany ....... 3840290

[51] Int. Cl.⁵ .................. G11B 5/00; G11B 15/14; G11B 15/46
[52] U.S. Cl. .......................................... 360/8; 360/64; 360/73.06
[58] Field of Search ............ 360/8, 52, 64, 73.01, 360/73.04–73.07

[56] References Cited

U.S. PATENT DOCUMENTS

| | | | |
|---|---|---|---|
| 3,631,427 | 12/1971 | Hein et al. | 360/52 |
| 4,303,950 | 12/1981 | Taniguchi et al. | 360/8 |
| 4,703,370 | 10/1987 | Inoue et al. | 360/10.2 |
| 4,942,487 | 7/1990 | Noguchi et al. | 360/77.13 |

Primary Examiner—Aristotelis Psitos
Assistant Examiner—Won Tae C. Kim
Attorney, Agent, or Firm—Frishauf, Holtz, Goodman & Woodward

[57] ABSTRACT

A method of recording and/or playing back a data signal, in an apparatus in which a tape helically encircles a drum containing a headwheel, and the heads scan oblique tracks on the tape, features reduction of the tape velocity by a factor 1/n where n is a positive integer. Along with the tape velocity change, the static tracking angle between the tape and drum is correspondingly adjusted so that the heads will continue to scan along a standard track pattern or format. The data rate of data signals retrieved from the tape (e.g. high-date rate satellite transmissions) or of incoming data signals can be converted to a different data rate by intermediate steps of writing to a digital memory and reading back at a more desirable data rate.

1 Claim, 3 Drawing Sheets

METHOD OF CONVERTING THE DATA RATE OF A DATA SIGNAL

This application is a continuation of application Ser. No. 07/440,236, filed Nov. 22, 1989, abandoned.

CROSS-REFERENCE TO EARLIER PATENTS, THE DISCLOSURES OF WHICH ARE HEREBY INCORPORATED BY REFERENCE

U.S. Pat. No. 4,150,773 of Apr. 24, 1979, FELL et al.;
U.S. Pat. No. 4,155,497 of May 22, 1979, FELL;
U.S. Pat. No. 4,390,913 of Jun. 28, 1983, FELL et al.;
U.S. Pat. No. 541,557 of Sep. 17, 1985, FELL et al.;
U.S. Pat. No. 4,573,619 of Mar. 4, 1986, GRANT-/KODAK.

Cross-Reference to Related Applications, Assigned to the Assignee of the Present Application, the Disclosures of Which are Hereby Incorporated by Reference:

U.S. application Ser. No. 07/045,688, filed May 1, 1987, HEDTKE & FACH, entitled TIME CODE READER IN A DEVICE FOR REPRODUCING VIDEO SIGNALS FROM MAGNETIC TAPE (German application P 36 15 468); U.S. application Ser. No. 07/204,194, filed Jun. 8, 1988, HEDTKE et al., entitled TEST AND MONITORING SYSTEM FOR A DIGITAL VIDEO TAPE RECORDER/REPRODUCER (German application P 37 19 498); U.S. application Ser. No. 07/394,588, filed Aug. 16, 1989, FELL, entitled METHOD OF SETTING A TRACKING ADJUSTMENT FOR AN OBLIQUE TRACK FOR MAGNETIC TAPE RECORDING AND PLAYBACK EQUIPMENT (claiming priority of German application P 38 29 972).

The present invention relates generally to a method of recording and reading or reproducing data signals on magnetic tape as a sequence of parallel oblique tracks, and, more particularly, to a method which permits increasing the information density on the tape by an integer n and correspondingly reducing the speed of the tape around the drum by the same factor n.

BACKGROUND

German Patent Disclosure Document 36 13 230 OMORI/MITSUBISHI (claiming the priority of Japanese application 83128/85 of Apr. 18, 1985) discloses a method of repetitive reproduction of video signals in which both the advancement speed of the magnetic tape and the rotation speed of the head drum or reading device are changed by a factor n with respect to the speed during recording. By reason of this simultaneous alteration of the magnetic tape advancement speed and the rotation speed of the reading device, the magnetic playback heads in a magnetic tape spooling system can read or sample the recorded tracks exactly and without signal losses and can read the recorded video signals without error.

In practice, however, the reduction of the rotation speed leads to a change in the frictional relationships between the tape and the reading device, so that the magnetic playback heads diverge from the recorded tracks and follow a curved path. This causes disturbances in the reproduced television images. Further, the change in relative speed causes a frequency transformation of the reproduced signal.

Conventional circuits, e.g. equalizers and clocking regenerators, cannot be used in this method and must be matched to the altered frequency spectrum of the reproduced signal. In this known method, video signals obtained by the magnetic reproduction heads are written into a memory and are repetitively read back out of the memory in time-compressed form.

Further, German Patent Disclosure DE-OS 35 17 317, SCHOLZ, teaches a method of reading digital signals recorded on oblique tracks, in which method the advancement speed of the magnetic tape is sensed and used to derive a drive factor which modifies the speed of a rotating magnetic head in such a way that, during playback, accurate tracking of the obliquely recorded signal is maintained. The data rate of the reproduced signal agrees with the data rate of the digital signal when it was recorded. However, even in this method, no constant frictional relationships exist, so the recorded track image cannot be retrieved without error.

Finally, German Patent Disclosure DE-OS 38 08 198, NOGUCHI/HITACHI (claiming the priority of Japanese application 56768/87 of Mar. 13, 1987) discloses an apparatus for recording and reproduction of a digital signal of magnetic tape. In the recording mode, the rotation rate of a rotating scanning device and the advancement speed of the magnetic tape is varied by a factor of n-times or 1/n-times the normal speed. In the playback mode, conversely, the rotation rate of the scanning device is kept constant and only the advancement speed of the magnetic tape is adjusted by the factor n or 1/n of the normal speed. For playback for the track image obtained during the recording mode, given n=2, it is necessary, first, to double the number of magnetic heads along the circumference of the rotating scanning device, and second, to dynamically guide the magnetic heads along the track position in the playback mode (ATF). Systems for dynamic guiding of the magnetic heads along tracks are, however, very expensive and are not adapted for guiding magnetic heads along a multiplicity of tracks.

THE INVENTION

It is an object of the present invention to provide a recording and a playback method in which a standard recorded track pattern can be scanned both in recording and in playback mode without any frequency transformation of the reproduced signal taking place. Further, the method should be less complicated and expensive than the prior art method. Still further, error-free operation should still be possible, even when the advancement speed of the tape differs substantially from the standard advancement rate. By "standard rate", we mean any of the standards used in the home, such as VHS or BETA, or used in broadcast studios for NTSC, PAL or SECAM programs, or used in satellite tracking stations.

Briefly, the advancement speed of the tape is reduced, by comparison with the standard advancement speed, by a factor which is the inverse or reciprocal of a positive integer and, in the helical guiding of the magnetic tape around the drum, the static track angle setting of the magnetic heads is modified such that the tracking course of the magnetic heads coincides with the specified track format. This has the advantage that magnetic tapes with a recorded track pattern can be scanned without frequency shifting. There is no frequency shifting of the data signal resulting from frequency transformation during the scanning process. This thus avoids use of an expensive dynamic tracking system.

It is particularly advantageous that one can play back data signals with a data rate which is reduced by a factor of 1/n with respect to the data rate of the recorded data signal. For example, such a data rate conversion is desired when evaluating satellite data signals. Satellite data signals are generally transmitted to earth at a high data rate and initially recorded on magnetic tape in broadband form. The evaluation of the stored satellite data in a computer cannot, however, take place in real time because of the data's speed which is present, so that to obtain slower satellite data requires data rate conversion.

The advancement speed of the magnetic tape is changed, while the speed between the magnetic heads and the magnetic tape remains constant. In order for the magnetic head to correctly scan the recorded tracks at the changed tape advancement speed, it is only necessary to adjust the static track angle setting of the magnetic heads, in dependence upon the respective tape advancement speed.

As explained further below, at the reduced tape advance speed the number of magnetic heads that would be needed to read the standard track pattern at standard scanning speed cannot all read tracks at the fractional tape speed, so that the head or heads which do correctly read tracks leave intervals of no signal in between track readings. For this reason the data rate conversion needs a digital memory connected to follow directly after playback from the headwheel. By use of the time interval between the storing of the tracks that are read into the digital memory, the data can be read out of the memory at a steady rate which is 1/n of the data rate of the read-out from the tape.

A further advantage is that one can convert the data rate even of data signals recorded with mutual azimuth offset of successively scanning magnetic heads.

In the event that data signals with a small data rate are present and have to be stored on the magnetic tape with a higher memory density, the data signals are initially written into the digital memory at the small data rate. The stored data are subsequently read out of the digital memory intermittently track by at a higher data rate and recorded onto the magnetic tape moving at a fractional speed to produce a standard track pattern that can be tracked with a full complement of heads at standard speed. By this means, there is created, for the data signal to be recorded, a lower limit frequency which is formed by the band pass character of the magnetic recording and playback system.

BRIEF FIGURE DESCRIPTION

DETAILED DESCRIPTION OF METHOD

For a long time, the recording and playback of data signals has been done using so-called instrumentation recorders, on which the data signals were recorded as longitudinal tracks. Variation of the advancement speed of the magnetic tape in such instrumentation recorders provides a simple way to alter the data rate of the reproduced signal during the playback operation. However, since the scanning speed of instrumentation recorders cannot be increased to any arbitrary extent desired, one equips magnetic tape devices with rotating scanning arrangements, whose sampling speed, and thus recording density, is substantially greater.

Magnetic tape devices with rotating scanning arrangements have parallel tracks which are oblique to the tape edge. Thus, a data rate conversion, as simple as that carried out in instrumentation recorders, cannot be achieved in magnetic tape devices having rotating scanning arrangements. If the playback speed deviates from the recording speed, the playback magnetic heads overshoot the recorded tracks. This necessarily increases the error rate in the reproduced data signal. It is therefore necessary to assure that the playback magnetic heads do not leave the recorded tracks.

Figure 1:
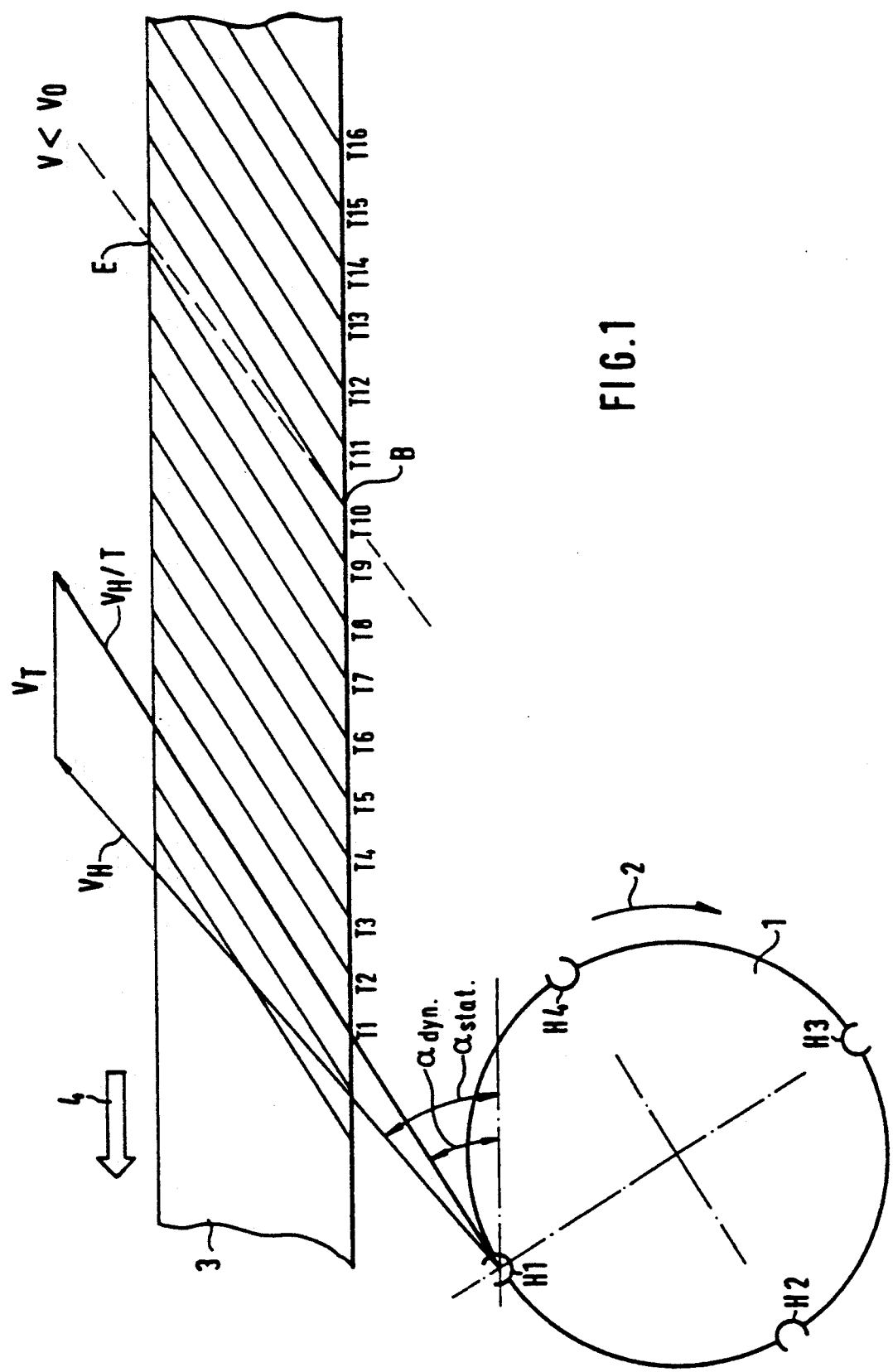
FIG. 1 is a schematic representation of the derivation of the track pattern according to the invention.

According to the method of the present invention, the static track angle is modified as a function of the tape advancement speed selected. The details of this method are described below with reference to the illustration of FIG. 1. As shown in FIG. 1, a headwheel disk 1 has arranged around its circumference magnetic heads H1, H2, H3, and H4. Headwheel disk 1 rotates in the direction of arrow 2. Headwheel disk 1 is part of a scanning arrangement (not shown) including a drum 23 about which a magnetic tape 3 is wrapped helically, so that a plurality of tracks T1 through T16 are scanned obliquely to the tape edge. Magnetic tape 3 moves in the direction of arrow 4. The tangential velocity vector $V_H$ of rotating magnetic heads H1, H2, H3 and H4 defines, with respect to the longitudinal direction of magnetic tape 3, a static track angle $\alpha_{stat}$. When this head velocity $V_H$ is added vectorially to the tape advancement velocity $V_T$, the result is the relative velocity vector $V_{H/T}$ with the dynamic track angle $\alpha_{dyn}$. Depending upon the respectively selected tape advancement velocity $V_T$ of magnetic tape 3, the dynamic track angle $\alpha_{dyn}$ varies, while the head velocity $V_H$ remains constant.

If the recording and playback are carried out with the identical tape advancement velocity and identical head wheel rotation rate, during playback mode the magnetic heads will scan the recorded tracks T1 through T16 exactly. If, however, as shown by the dashed line at track T10, the tape velocity $v_T$ is reduced, there will be a corresponding increase in the dynamic track angle $\alpha_{dyn}$. In that event, a playback magnetic head will indeed still intersect the recorded track at the beginning of the track. However, depending upon the tape advancement velocity selected, the playback magnetic head will, by the time it reaches track end E, deviate from the recorded track T10 by following the dynamic track angle $\alpha_{dyn}$.

In order for the recorded tracks to be exactly scanned even in playback mode after modification of tape velocity $V_T$, the tape velocity $V_T$ is varied in steps $V_0/2$; $V_0/3 \ldots V/n$ and the static track angle $\alpha_{stat}$ is modified correspondingly, according to the selected tape advancement velocity.

Devices for modification of the static track angle $\alpha_{stat}$ are known per se. It is known from U.S. Pat. No. 4,573,619, GRANT/KODAK, to axially displace two magnetic tape edge guides, which are arranged at the input and output of a rotating scanning device, by altering the positioning voltages applied to piezo-electric elements. However, the preferred embodiment of the present invention requires only a single magnetic tape edge guide which influences the track angle to track end E.

Further, German Patent Disclosure 35 07 660 A1, INOUSE & OHBAYASHI/JVC, and corresponding U.S. Pat. No. 4,703,370 (Oct. 27, 1987) disclose a magnetic tape playback apparatus with a tiltable tape guiding drum. In dependence upon the selected tape advancement velocity, one can, with such a device, carry out a matching of the static track angle $\alpha_{stat}$ to the changed dynamic track angle $\alpha_{dyn}$.

By stepwise changes of the tape advancement velocity, one assures that at least one of magnetic heads H1 through H4 scans the recorded tracks, while other magnetic heads pass between the tracks and are therefore not useful for picking up signals. For example, with a selected tape velocity $V=Vo/2$, every other magnetic head is skipped, while with $V=Vo/3$, two magnetic heads are skipped for signal pickup purposes and with $V=Vo/n$, $n-1$ magnetic heads must be skipped. The factor n must be an integer; it is, however, not limited, not even by the number of magnetic heads provided on head wheel disk 1. For example, head wheel 1 can rotate twice before the next head again passes precisely over a track. In this manner, tape velocity can be reduced by factors of $n > 100$.

The time interval between two track scans is used for data rate conversion. In the course of recording on tape a data signal at a data rate which is reduced by a factor 1/n with respect to the data rate of the incoming data signals, initially the incoming signal is written into a memory, and subsequently read out of the memory at a data rate increased by a factor of n with respect to the data rate of the incoming data signal, and then recorded on the magnetic tape.

During playback of recorded data signals at a data rate reduced by the factor 1/n with respect to the data rate of the incoming signal, the data of the data signals read from the magnetic tape are written into the memory at a data rate corresponding to the data signals read and are read out of the memory with a data rate reduced by a factor 1/n.

In the event of a scan in which an azimuth offset is present between neighboring tracks, the possible tape velocity steps are limited to odd values of n (1, 3, 5, 7, ... n) in order to assure a track-precise scanning.

DETAILED DESCRIPTION OF APPARATUS

Figure 2:
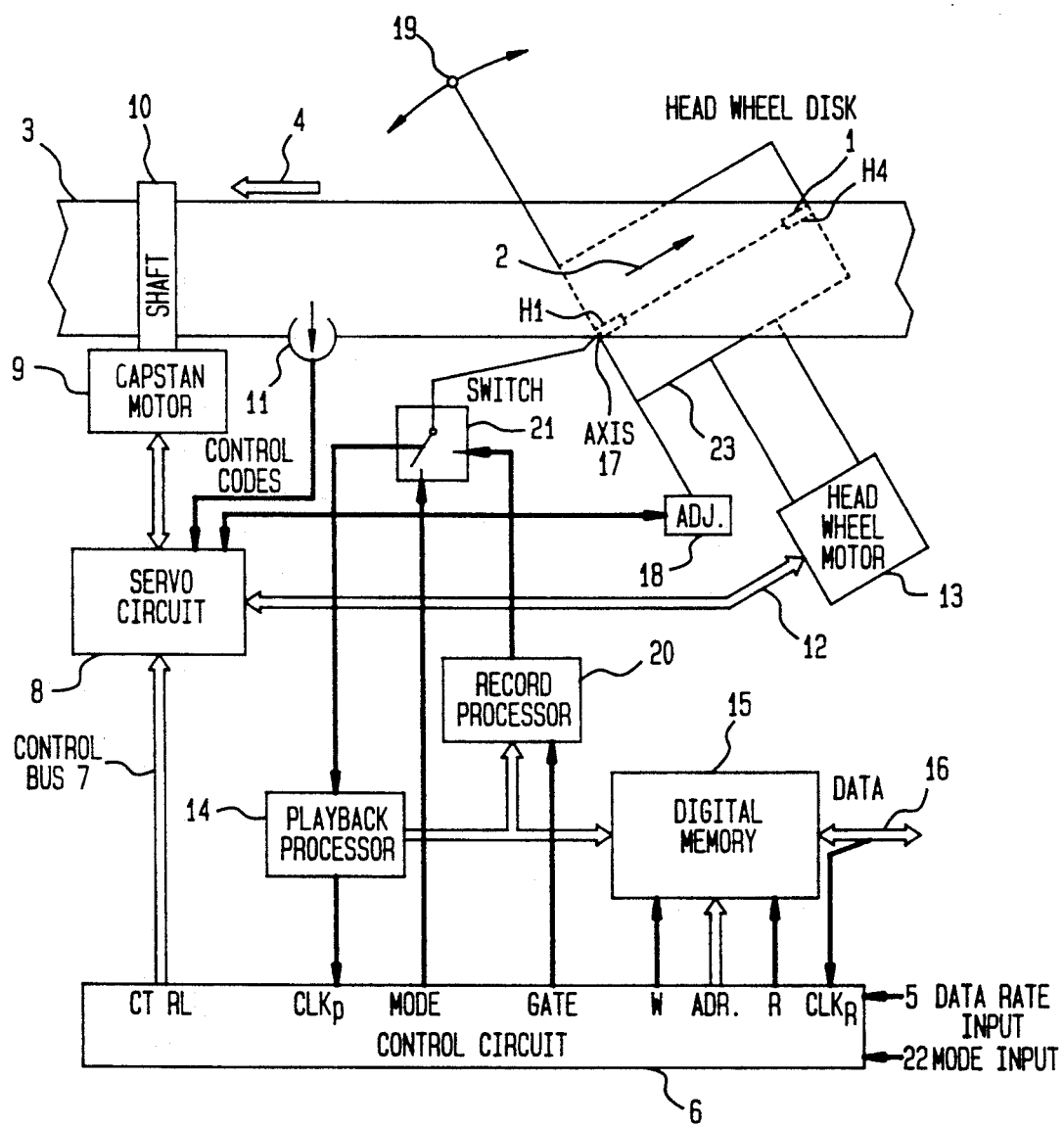
FIG. 2 is a schematic block diagram of the apparatus for data rate conversion.

FIG. 2 is a block diagram of apparatus for conversion of the data rate of an incoming or recorded data signal. The selection of the desired data rate is made over an input 5 of a control circuit 6 and transmitted thence via a control bus 7 to a servo circuit 8. The setting or adjustment of the tape advancement velocity of magnetic tape 3 in the direction of arrow 4 is carried out by a connection from servo circuit 8 to capstan motor 9 and a shaft 10 mechanically connected therewith. During playback of recorded data signals, in order to maintain a uniform tape advancement velocity, a control track on magnetic tape 3 is read with a magnetic head 11, for example as disclosed in DE-OS 36 15 468, HEDTKE & FACH, and corresponding U.S. Pat. No. 4,953,040, and the control track pulses found there are evaluated in the servo circuit for tape advancement regulation. Further, servo circuit 8 is connected, via a bus connection 12, to a headwheel motor 13 for driving headwheel disk 1. Around the circumference of headwheel disk 1 are arranged the magnetic heads H1 through H4 which scan, in the direction of arrow 2, the tracks T1-T16 recorded obliquely along magnetic tape 3.

During playback operation, the data signals obtained by magnetic heads H1 through H4 by scanning of magnetic tape 3 are fed through a PLAYBACK processor 14, where they are preamplified, equalized and prepared for storage in a digital memory 15. In dependence upon the data rate of the data signals read from magnetic tape 3, the prepared data signals are written word-by-word into memory 15 using address- and write-commands of control circuit 6. The process of reading out of memory 15 is carried out at a data rate reduced by the factor 1/n. The data signal, having a data rate reduced by the factor 1/n, can be taken off at an output port 16 of memory 15.

The setting or adjustment of the static track angle is indicated in FIG. 2 by tiltable-axis line 17 of headwheel disk 1. This axis 17 is tiltable, as indicated by arrows 19, in dependence upon the adjustment of positioning element 18, under the control of servo circuit 8.

Control circuit 6 controls the timing operations as a function of the values n selected via input 5. For example, if a factor of $n=4$ is selected, whenever valid data signals are present during playback operation, the data signal prepared by playback processor 14 is written into memory 15. The times, during which no valid data can be read from magnetic tape 3, are bridged over by the longer read-out process of memory 15.

The recording process is similar to the previously described playback process. Here, the direction of the data rate conversion is essentially turned around. Incoming data signals with an arbitrarily high data rate come in over input 16 and are written into memory 15. When a predetermined percentage of memory 15 is filled, the collected data are fed, under the control of control circuit 6, in bit-parallel form to a RECORD processor 20 and thence in serial form to the magnetic heads H1 through H4 for recording onto magnetic tape 3. In the present example, the PLAYBACK processor 14 and the RECORD processor 20 are connected with magnetic heads H1 through H4 via a selector switch 21 controlled by control circuit 6. Such a selector switch can be dispensed with, if separate recording and playback magnetic heads are provided. The selection of the desired operation mode (recording or playback) is carried out over an input 22 of control circuit 6.

The output rate of memory 15 can be arbitrarily selected. In the recording process, as in the playback process, only specific tape advance velocities are possible, e.g. $V_T = Vo, Vo/2, Vo/3, \ldots Vo/n$. The matching of the static track angle using positioning element 18, the control of the magnetic tape and rotation speeds of the magnetic heads, as well as the selection of the magnetic heads in engagement with the magnetic tape, are carried out in dependence upon the velocity selected at input 5, as in the case of playback. In this fashion, there results, on magnetic tape 3, regardless of which recording velocity is selected, a track pattern which corresponds to a predetermined (standardized) track pattern with regard to the dynamic track angle and the recorded bit count.

The information flow of data from or to the magnetic tape can also be time-equalized, in that defined data blocks with defined rates and bit counts can be temporally compressed or expanded. In a concrete example, a data signal with a bit rate of 533 megabits per second is recorded on or played back from magnetic tape via eight magnetic heads. The tape advancement velocity is 662 millimeters per second and the relative head-tape velocity is 41.44 meters per second. The static track angle is 5.488 degrees and the dynamic track angle is 5.400 degrees. Eight magnetic heads are provided on headwheel 1. They are arranged around the circumference of a headwheel disk having a diameter of 75 mm. The heads scan a region of the magnetic tape 16 mm wide.

Figure 3:
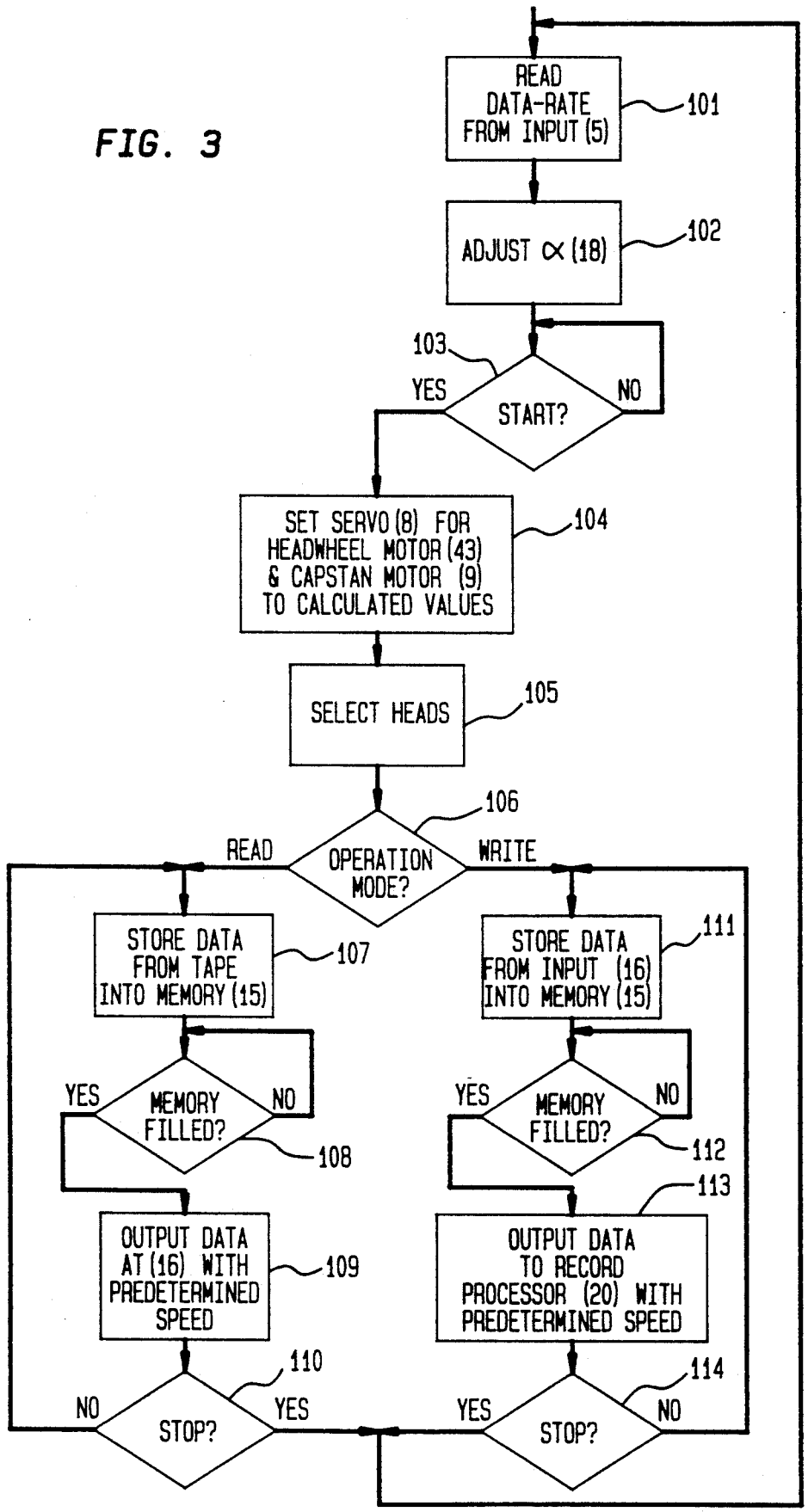
FIG. 3 is a flowchart of the method of the invention.

The flowchart of FIG. 3 illustrates the steps of the method of the present invention. In step 101, the desired data rate is read from input 5. In step 102, the tracking angle is adjusted by means of element 18. In step 103, a test is made to determine whether the process is to be started. In step 104, servo circuit 8 sets headwheel motor 13 and capstan motor 9 to calculated values. In step 105, the heads to be used are selected. In step 106, either the READ operation mode or the WRITE operation mode is selected.

In the former case, step 107 stores data from the tape into digital memory 15. Step 108 tests whether the memory is filled to a predetermined level. If so, in step 109, data is output to port 16 via PLAYBACK processor 14 at a predetermined speed. In step 110, a decision is made whether to stop or to repeat the whole READ operation from the beginning.

In the case of WRITE operation mode being selected, step 111 reads data from input port 16 and stores in digital memory 15. Step 112 tests whether the memory is filled to a predetermined level. If so, in step 113, data is output to RECORD processor 20 at a predetermined speed. In step 114, a decision is made whether to stop or to repeat the whole WRITE operation from the beginning. If the result of either step L10 or step 114 is YES, the entire routine repeats, starting from step 101.

I claim:
1. In a magnetic tape recording system having
   a control circuit (6),
   a memory (15), controllable by said control circuit for converting a data rate of digital data signals by writing said data signals into said memory intermittently at a first data rate and retrieving them from said memory with normal continuity at a second data rate, which second data rate differs from the first data rate by a factor 1/n, where n is an odd positive integer greater than 1,
   an input/output port (16) coupled to said memory (15),
   a tape guiding drum (23) with a plurality of magnetic heads (H1–H4) rotatable on a headwheel (1) inside said drum on a tiltable axis (17) for scanning a magnetic tape (3) helically encircling said drum and passing across said drum at a defined advancement speed, said magnetic heads on said headwheel having alternatingly different azimuth head settings,
   said magnetic heads scanning a series of parallel oblique tracks (T1–T16) on said magnetic tape, said tracks defining a standard track pattern when both advancement of said tape and rotation of said headwheel are at standard speed,
   a method of converting the data rate of a stream of data signals passing from said tape (3) to said port (16) through the intermediary of said memory (15),
comprising the steps of
reducing the speed of said magnetic tape (3) during playback in relation to said standard speed by a factor 1/n, where n is an odd positive integer greater than 1,
changing a tilt of said drum (23), for adjusting a static track angle, in such a way that at least one of said rotating magnetic heads (H1–H4) follows an oblique course which coincides with a track of said standard track pattern, and
writing intermittently into said memory (15) only playback data signals read from said magnetic tape (3) by every nth one of said plurality of magnetic heads while a said respective head follows an oblique course which coincides with a track of said standard pattern and reading out said written in data from said memory with normal continuity to said port (16) at a rate reduced by said factor 1/n from the data rate at which said playback data was intermittently written into said memory.

* * * * *